United States Patent [19]

Ozawa

[11] Patent Number: 5,311,109
[45] Date of Patent: May 10, 1994

[54] LOCOMOTION CONTROL SYSTEM FOR LEGGED MOBILE ROBOT

[75] Inventor: Nobuaki Ozawa, Saitama, Japan

[73] Assignee: Honda Giken Kogyo Kabushiki Kaisha, Tokyo, Japan

[21] Appl. No.: 38,531

[22] Filed: Mar. 29, 1993

[30] Foreign Application Priority Data

Mar. 31, 1992 [JP] Japan .................. 4-105315

[51] Int. Cl.[5] .......................... B25J 11/00; B25J 9/00
[52] U.S. Cl. ........................ 318/568.11; 318/568.12; 318/568.16; 901/1; 180/8.1
[58] Field of Search ........... 318/568.12, 568.1, 568.22, 318/567-572; 395/80-98; 901/1, 3, 9, 48; 180/8.1-8.6

[56] References Cited

U.S. PATENT DOCUMENTS

| | | | |
|---|---|---|---|
| 4,547,858 | 10/1985 | Horak ................... | 318/568 |
| 4,621,332 | 11/1986 | Sugimoto et al. ................... | 318/568 |
| 4,639,652 | 1/1987 | Takahashi et al. ................ | 318/568 |
| 4,710,884 | 12/1987 | Tokairin et al. ...................... | 901/48 |
| 4,834,200 | 5/1989 | Kajita ................... | 901/1 X |
| 4,987,356 | 1/1991 | Yamada et al. ..................... | 318/578 |
| 5,049,797 | 9/1991 | Phillips ........................... | 318/568.16 |
| 5,151,859 | 9/1992 | Yoshino et al. ......................... | 901/1 |
| 5,159,988 | 11/1992 | Gomi et al. .............................. | 395/1 |
| 5,206,569 | 4/1993 | Ozawa ........................... | 318/568.12 |
| 5,214,749 | 5/1993 | Brown ................... | 395/95 |

FOREIGN PATENT DOCUMENTS 62-97006 5/1987 Japan .

OTHER PUBLICATIONS

Article, "A Torque Sensing Technique Using Elasticity of Harmonic Drives and its Application to Toruqe Control" (JP) with a brief description in English Patent Abstract in English of JP62-97006.

Primary Examiner—Paul Ip
Attorney, Agent, or Firm—Lyon & Lyon

[57] ABSTRACT

A locomotion control system of a biped walking robot having a body and two articulated legs including ankle joints and connected to the body. A mathematical model is predesigned to approximate the robot. The mathematical model is assumed to have ideal rigidity and based on the model target angles of the joints including the ankle joints are preestablished in advance. Robot joints are provided with servo motors and control values are determined on the basis of the target joint angles to drive the servo motors to follow the target joint angles. A sensor is provided to detect moment acting on the ankle joints or the legs. The detected moment is multiplied by a gain made up of the reciprocal number of the amount of rigidity of the ankle joints. And based on the product, the control value is corrected so as to compensate the deformation. As a result, the discrepancy between the model and the actual robot is compensated so that, not only the robot can walk more stably, but the freedom of possible compliance control can be increased. Moreover, the legs can have low weight and inertia so that the walking stability can be further enhanced.

8 Claims, 8 Drawing Sheets

LOCOMOTION CONTROL SYSTEM FOR LEGGED MOBILE ROBOT

BACKGROUND OF THE INVENTION

1. Field of the Invention

This invention relates to a locomotion control system for a legged mobile robot, more particularly to such a system which feedback-compensates the discrepancy between the robot's rigidity assumed in a model and the actual robot's rigidity so as to increase the apparent or virtual rigidity and enable the robot to be treated in terms of an ideally rigid model.

2. Description of the Prior Art

Legged mobile robots are known to the art. See the teaching of Japanese Laid-Open Patent Publication No. 62(1987)-97,006, for example.

To be able to walk stably, a legged mobile robot is required to satisfy prescribed dynamic stability conditions. These conditions can be met either by solving dynamic problems in real time as they are encountered during locomotion or by solving the problems in advance. For realizing either method, the robot has to be mathematically modeled. While the model should preferably approximate the actual robot with a high degree of accuracy, this is hard to achieve in actual practice. Since numerous factors involved are difficult to model and because of various other restrictions, such as the need to shorten processing time or reduce the labor required for creating the model, the model used is invariably only an approximate one.

It is a characteristics of the legged mobile robot that the legs have to be swung at high speed during walking, while, at the same time, the joints and links of the legs are subject to heavy loads (bending moments). Because of this, it is preferable for the robot's legs to be light in weight and low in inertia (inertial force) so as to reduce the amount of energy required for swinging the legs and also to prevent stability degradation owing to the reaction forces produced by the swinging of the legs. If, however, the mathematical model of the robot assumes high rigidity or if it does not take the robot's elastic elements into account, the actual robot rigidity also has to be high. Thus the robot has to be light in weight and low in inertia, in addition to being rigid. It is difficult to satisfy both of these requirements. A legged mobile robot includes joints and other moving parts that cannot easily be made high in rigidity. It also uses force sensors of the type which detect strain and various other elements which cannot easily be increased in rigidity. As a practical matter, therefore, it is next to impossible to achieve the required weight and inertia reduction while simultaneously increasing rigidity to the point where the elastic elements of the robot can be ignored. Because of this, any attempt to satisfy the dynamic stability requirements for walking by the use of a rigid model for a robot that includes elastic elements will be prevented from realizing the desired walking stability by the approximation errors between the actual robot and the model.

SUMMARY OF THE INVENTION

The object of this invention is therefore to provide a locomotion control system for a legged mobile robot which overcomes the aforesaid problems, more particularly to such a system which tolerates insufficient rigidity resulting from weight and inertia reduction aimed at decreasing the load on the control system by enabling use of a rigid model but which prevents degradation of walking stability.

Another object of this invention is to provide a locomotion control system for a legged mobile robot which enables to conduct compliance control more effectively.

For realizing this object, the present invention provides a system for controlling locomotion of a legged walking robot made up of at least one linkage connecting a joint by links, comprising first means for predesigning a model of the robot to determine a target angle of the joint, second means for determining a control value in response to the determined target angle of the joint, third means for detecting moment of force acting on the joint or the linkage to estimate the deformation thereof, control means for correcting the control value to compensate the deformation, and servo motor means for driving the joint in response to the corrected control value.

BRIEF DESCRIPTION OF THE DRAWINGS

The above and other objects and advantages of the invention will be more apparent from the following description and drawings, in which.

DETAILED DESCRIPTION OF THE PREFERRED EMBODIMENTS

Embodiments of the invention will now be explained based on a biped walking robot as an example of a legged mobile robot.

Figure 1:
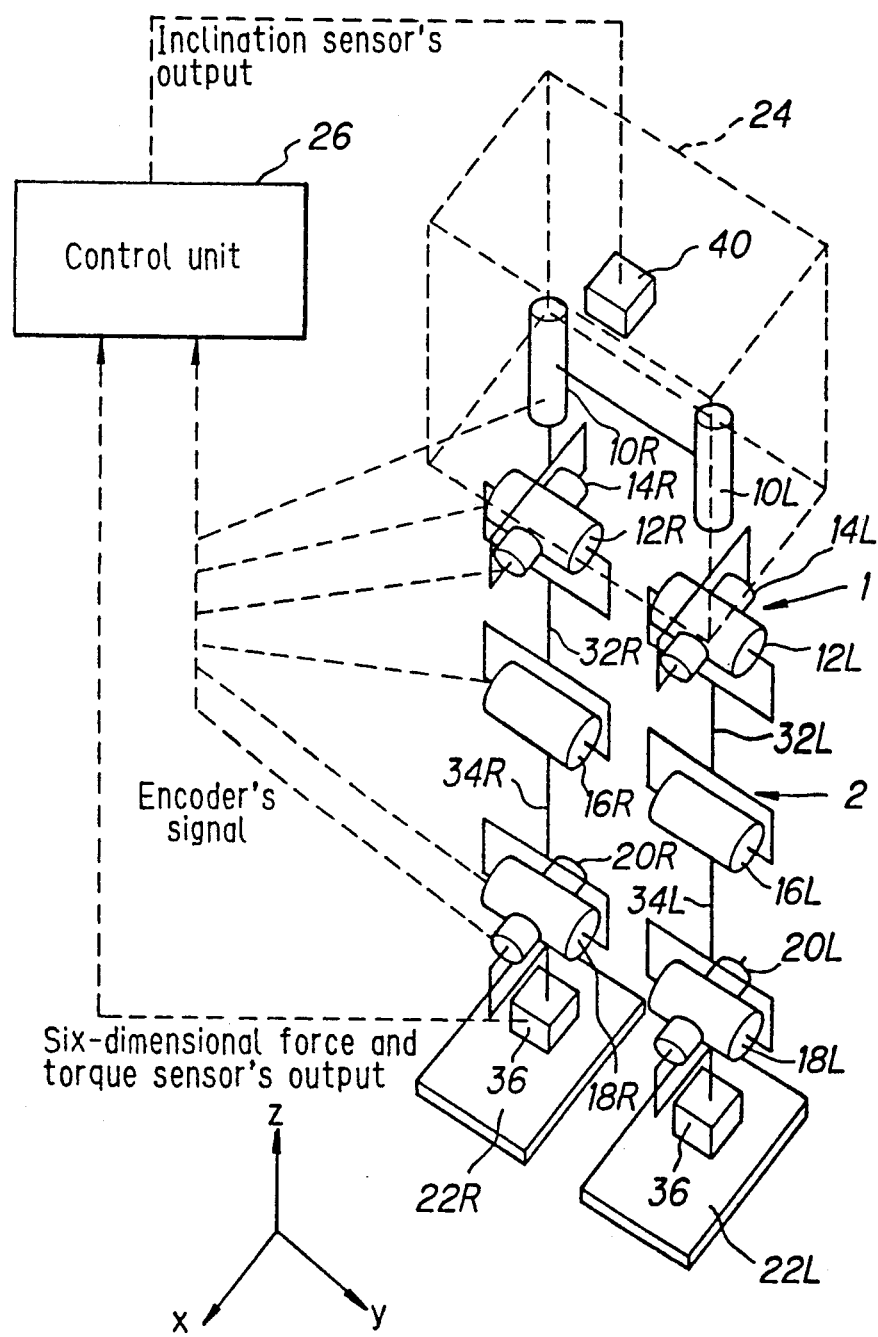
FIG. 1 is a schematic view showing the overall configuration of a locomotion control system for a legged mobile robot according to the invention.

An overall skeleton view of a biped robot 1 is shown in FIG. 1. The robot 1 has left and right legs each having six joints (axes). (To make the arrangement easier to understand, the joints (axes) are represented as the electric motors by which they are driven.) The six joints (axes) are, starting at the top, joints (axes) 10R, 10L for swiveling (generally horizontal rotation) of the legs at the hip (R and L indicating the right and left legs), joints (axes) 12R, 12L for rotation at the hip in the roll direction (rotation about the y axis), joints (axes) 14R, 14L for rotation at the hip in the pitch direction (rotation about the x axis), joints (axes) 16R, 16L for rotation at the knee in the roll direction, joints (axes) 18R, 18L for rotation at the ankle in the roll direction and joints (axes) 20R, 20L for rotation at the ankle in the pitch direction. Foot members 22R, 22L are provided at the lower end of this arrangement and a body (main unit) 24 housing a control unit 26 is provided at the upper end. The hip joints in the foregoing configuration are constituted by the joints (axes) 10R(L) 12R(L) and 14R(L) and the ankle joints by the joints (axes) 18R(L) and 20R(L). The hip and knee joints are connected by thigh links 32R, 32L and the knee joints and ankle joints by crus links by 34R, 34L.

The leg links of the respective legs thus have six degrees of freedom, so that during locomotion the legs as a whole can be caused to execute the desired motion by driving the 6×2=12 joints (axes) to appropriate angle. The robot is thus capable of walking freely within three dimensional space. The joints are provided mainly by electric motors, as was mentioned earlier, and Harmonic drives (trade name) for increasing motor torque. The structure of the joints is described in the assignee's earlier Japanese Patent Application No. 1(1989)-324,218 (Japanese Laid-Open Patent Publication No. 3(1991)-184,782) etc., and since it is not essential aspect of the present invention, will not be explained further here.

The individual ankles of the robot 1 shown in FIG. 1 are provided with a six dimensional force and torque sensor 36 of conventional design. By measuring the x, y and z force components Fx, Fy and Fz transmitted to the robot through the foot members and also measuring the moment component Mx, My and Mz around the three axes, the six-dimensional force and torque sensor 36 detects whether or not the associated foot member has landed and the magnitude and direction of the forces or moments acting on the supporting leg. Although not illustrated in FIG. 1, the sole of each foot member is equipped at its four corners with touchdown switches 38 of conventional design for detecting whether or not the foot is in contact with the ground. The top of the body 24 is provided with an inclination sensor 40 for detecting the robot's inclination angle and angular velocity relative to z axis in the x-z and y-z planes. Each electric motor at the individual joints is provided with a rotary encoder for generating rotational information. Further, although not illustrated in FIG. 1, the robot 1 is provided with a zero reference switch 42 for setting the robot's beginning attitude (upright) and a limit switch 44 for preventing overruns. The outputs of the sensors 36 and the like are sent to the control unit 26 in the body.

Figure 2:
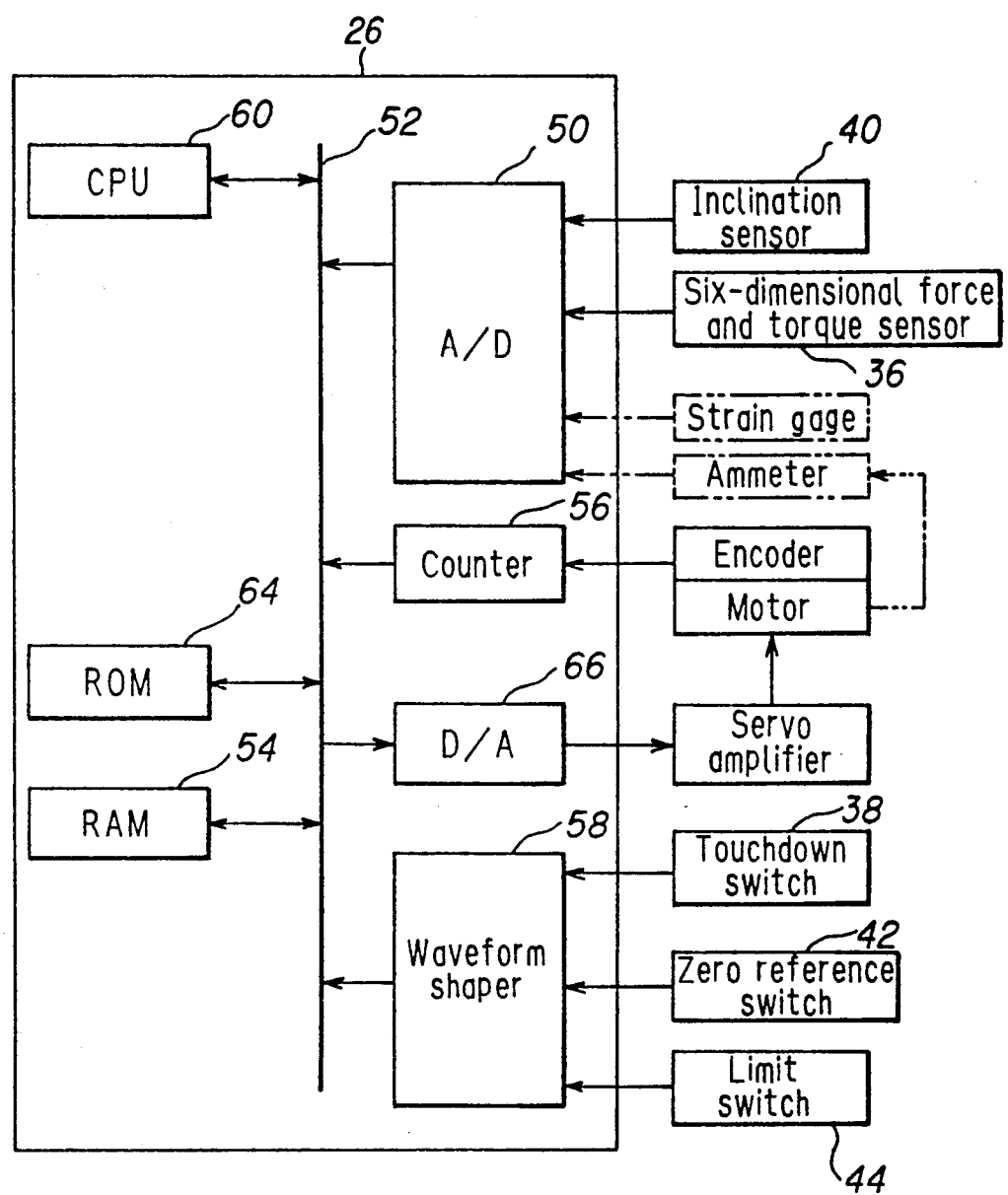
FIG. 2 is a block diagram showing the details of a control unit illustrated in FIG. 1.

As shown in the block diagram of FIG. 2, the control unit 26 has a microcomputer. The outputs from the inclination sensor 40 etc. are converted into digital signals by an A/D converter 50 and the resulting digital values are sent via a bus 52 to a RAM (random access memory) 54 for storage. In addition, the outputs of encoders disposed adjacent to the respective motors are input to the RAM 54 through a counter 56, while the outputs of the touchdown switches 38 are stored in the RAM 54 via a waveform shaper 58. The control unit has a CPU 60 which fetches a walking pattern from a ROM (read-only memory) 64 and computes control commands of the individual joint motors and sends the same to associated servo amplifiers thereof via a D/A converter 66, as will be explained later.

Next operation of the system will be explained.

Figure 3:
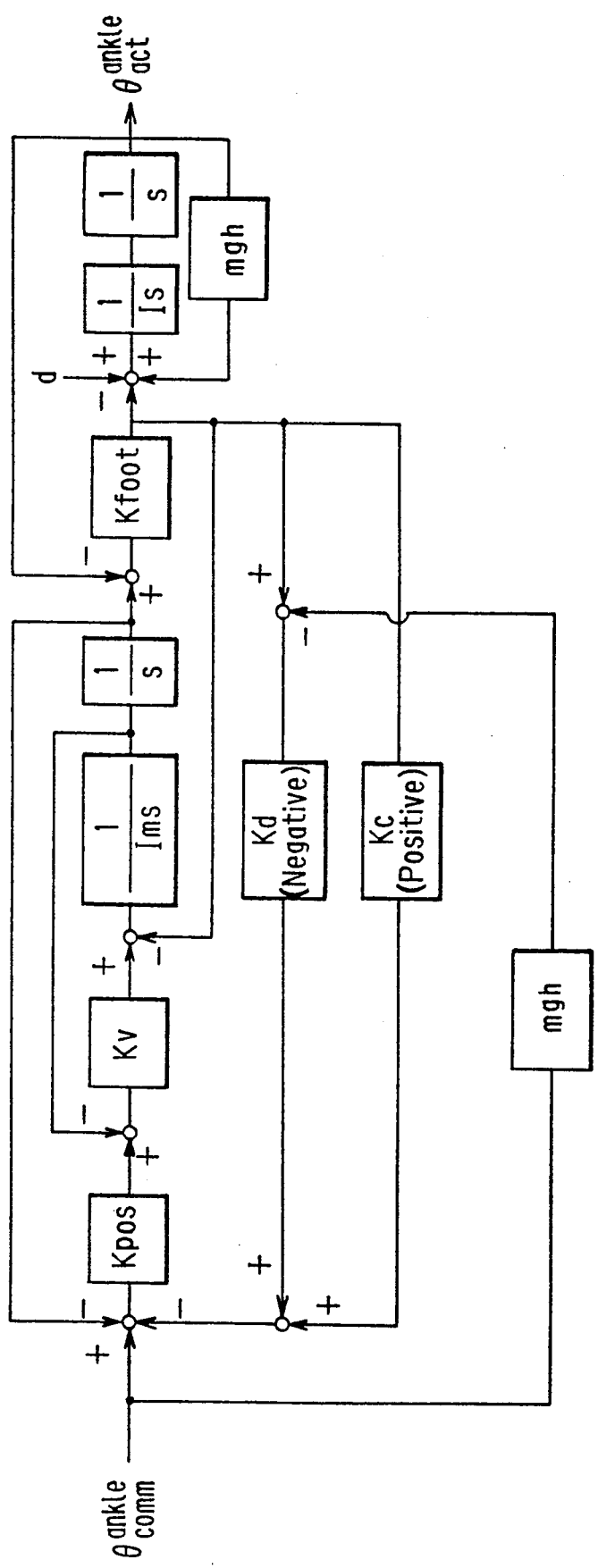
FIG. 3 is a block diagram showing the operation of the control system according to the invention.

A block diagram of the operation as it relates to the ankle joints 18, 20R (L) is shown in FIG. 3.

Figure 4:
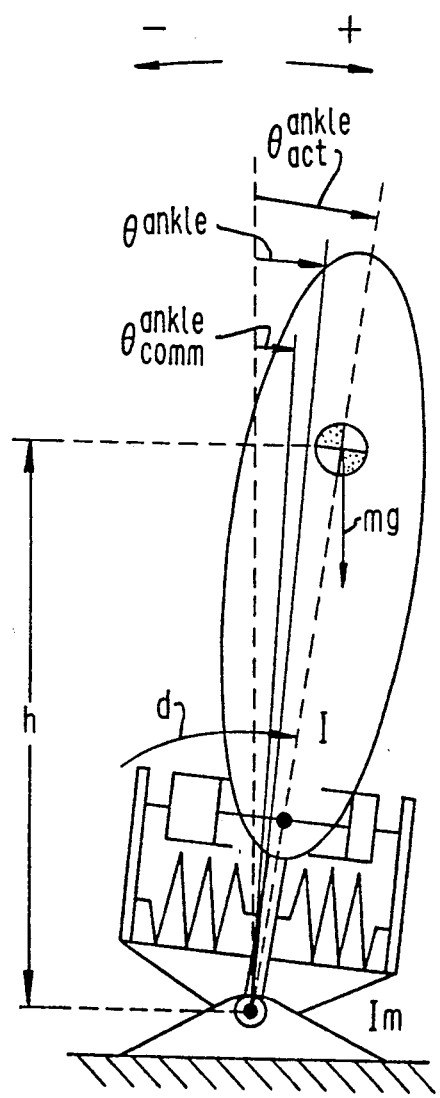
FIG. 4 is an explanatory view of a robot's ankle joint model assumed in the control system according to the invention.

Here, control of joints other than the ankle joints (joints 10, 12, 14, 16R (L)) is conducted only by use of conventional positional and velocity feedback for causing the angles of the individual joints to follow the command values and, as shown, additional feedback compensation of ankle deformation is conducted in respect to the ankle joints 18, 20R (L). Since the ankle joints 18, 22R (L) are situated at the end of the leg link 2, any increase of the load thereon greatly increases the inertia of the entire leg link. Priority is therefore placed on reducing the weight of these joints. In addition, the intersecting axis structure of the ankle joints limits the degree to which their rigidity can be increased. The fact that the six-dimensional force and torque sensor 36 is mounted below the ankle joints 18, 20R (L) further reduces the rigidity relative to other portions. In this invention, therefore, the robot 1 is assumed by a model having ideal rigidity and the aforesaid walking pattern is determined in advance on the basis of the rigid model. And the vicinity of the foot is approximated as a spring-/damper/mass system as shown in FIG. 4 such that the amount of deformation is estimated by considering the moment detected by the six-dimensional force and torque sensor 36 to be the force acting on the spring. Command values for the motors determined on the basis of the rigid model will then be corrected so as to compensate the deformation.

Figure 5:
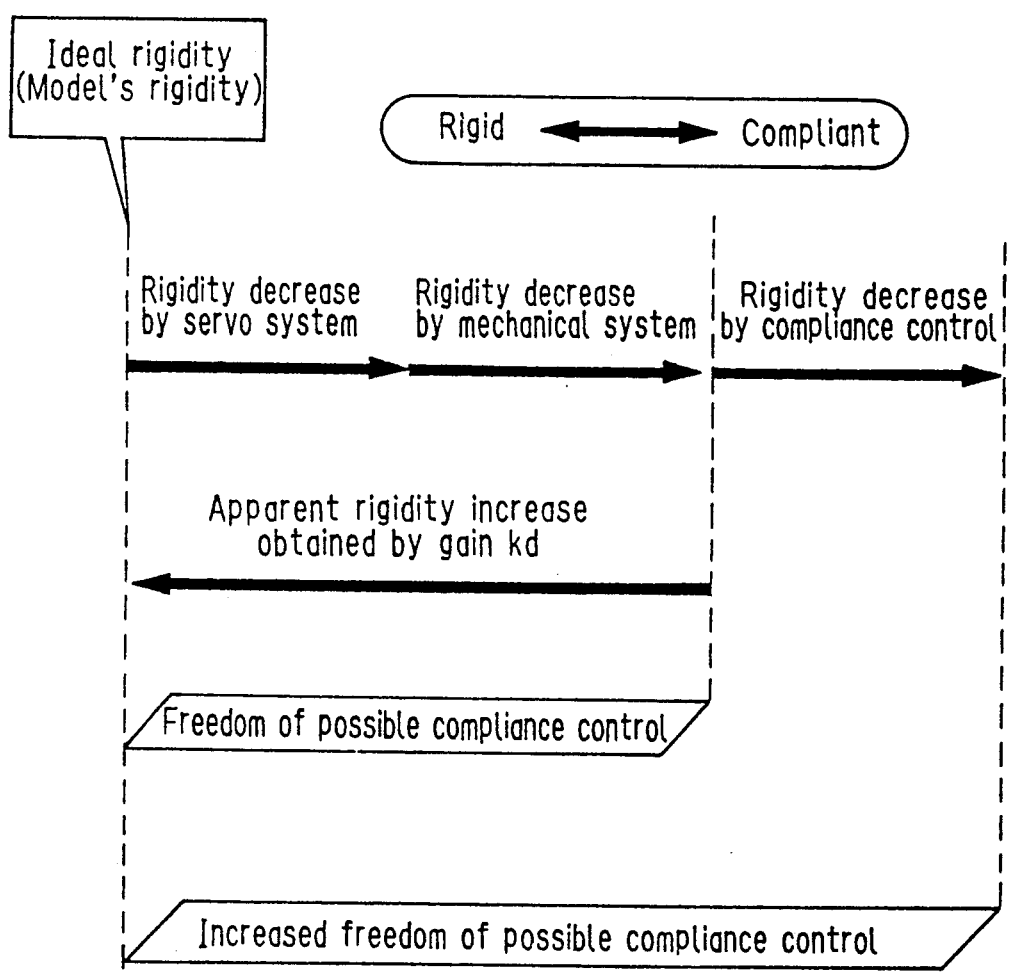
FIG. 5 is an explanatory view showing an apparent or virtual rigidity of the robot obtained by the control system according to the invention.

This will further discussed presuming a state of static equilibrium. In the interest of simplicity, the damper effect will be ignored. If the rigidity of the foot is defined as Kfoot, the force as F and the amount of deformation as X, it holds that F=Kfoot·X. The rigidity Kfoot includes both the rigidity of the servo system and the rigidity of the mechanical system of the robot 1. In the control according to the invention, the reciprocal (number) of the rigidity Kfoot, i.e. 1/Kfoot, is obtained and a feedback compensation gain Kd is defined in connection with the reciprocal. The product of the feedback gain Kd and the detected moment is then used to correct the command value $\theta$ankle comm. As shown in FIG. 5, a value equivalent to the servo system's rigidity and the mechanical system's rigidity is compensated by the feedback gain Kd to obtain an apparent or virtual rigidity that is infinitely large, i.e. the rigidity expected in the model.

Namely, in the model of FIG. 4, if the ankle joint angle becomes the value $\theta$ankle act beyond the ankle joint command value $\theta$ankle comm from the reason that the rigidity is not infinitely large, the actual moment Mact about the ankle becomes $$\text{Mact} = mgh \times \sin(\theta\text{ankle act})$$

since the ankle joint angle becomes $\theta$ankle act, instead of $$\text{Mcomm} = mgh \times \sin(\theta\text{ankle comm})$$

therefore $$\text{Mcomm} < \text{Mact}$$

as it would be if the rigidity were infinite. The value Mcomm, which is the moment expected in the model, is smaller than the actual moment Mact. In this control, therefore, correction is conducted such that $$\theta\text{ankle act} = \theta\text{ankle comm}$$

which results $$M_{act} = mgh \times \sin(\theta\text{ankle comm})$$

Namely, as mentioned above, the deformation of the ankle joint caused by the actual moment $M_{act}$, if named as $\theta$ankle deform, will be obtained as $$\theta\text{ankle deform} = M_{act} \times K_d$$

Accordingly, if the corrected value, here named as $\theta'$ankle comm, be $$\theta'\text{ankle comm} = \theta\text{ankle comm} - \theta\text{ankle deform}$$

then $$\theta\text{ankle act} = \theta'\text{ankle comm} + M_{act} \cdot K_d = \theta\text{ankle comm}$$

By compensating the deformation thus, at least the ankle joints 18, 20R (L) of the robot 1 have infinite apparent (or virtual) rigidity expected in the model. Here, if the robot is not under a condition of static equilibrium, it suffices to determine the control input by solving the equation of motion.

Another feature characterizing the invention is that by making the apparent (or virtual) rigidity of the ankle joints infinite, as shown in FIG. 5, the freedom of possible compliance control is enhanced. For this, compliance control can be conducted more effectively using another compliance feedback gain Kc, as shown in the block diagram of FIG. 3.

The operation will now be explained in detail with reference to the flow chart of FIGS. 6, which shows the first half (Start to S30) of the operations conducted by the control unit 26 of FIG. 2, and FIG. 7, which shows the latter half thereof (S32 to END).

Figure 6:
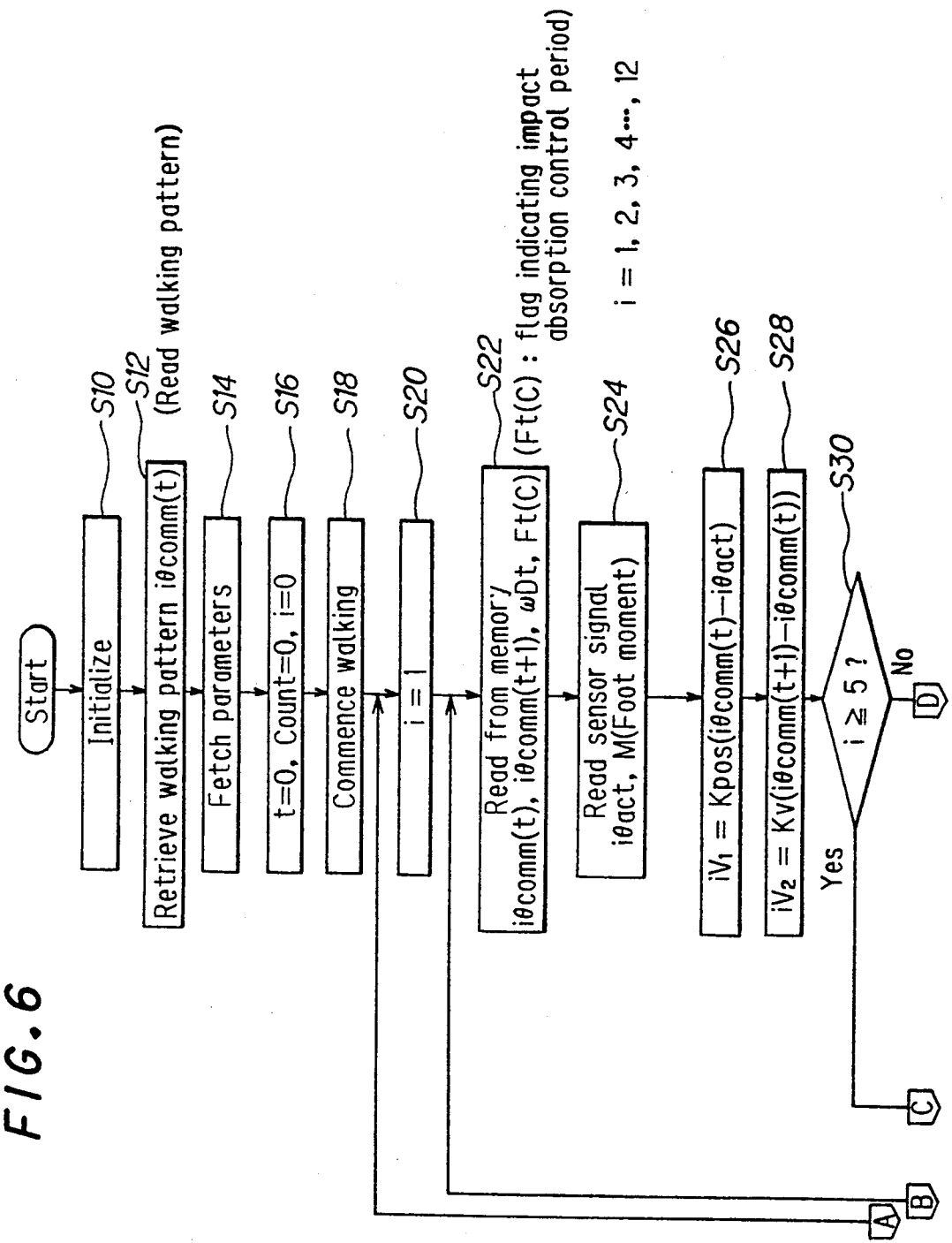
FIG. 6 is the first half of a flow chart showing the operation of the control system.

The overall system is first initialized at step S10 of FIG. 6. Control then passes to step S12 in which the walking pattern or data $i\theta$comm(t) is retrieved. This walking pattern or data comprises of the target angles for the respective joints used by the robot to walk over an ideally flat surface of uniform hardness. The subscript i represents the joint number and the whole term represents the target angle for the ith joint at time t. The joints are numbered in order from the bottom up as 20R=1, 20L=2, ... (In FIG. 4, i=1 to 4 are indicated as "ankle.") As was explained earlier, the time series data for the joints are calculated in advance on the basis of the rigid mathematical model of the robot 1, using a large computer, and the calculated time series data are stored in the ROM 64 of the microcomputer in the control unit.

Control passes to step S14 in which the parameters, e.g. feedback gains Kpos, Kv etc., are fetched, to step S16 in which the timer value t, the counter value Count and the joint number (counter) value are set to zero, and to step S18 in which walking is commenced, to step S20 in which the value of the counter for counting the joint numbers i is set to 1. Control then passes to step S22 in which the joint angle $i\theta$comm(t) (i=1) etc. associated with the set joint number are read from the ROM 64. The symbol $i\theta$comm(t+1) in the figure indicates the target joint angle at the time of the next program activation following that at the current time t. Symbol Ft(C) refers to a flag indicating a footfall impact absorption control period. The flag bit is set to 1 during such periods. In this control, the period is the free leg period and a short period continuing therefrom after the free leg has landed. The reason why the free leg period is included is to prepare a case in which the free leg lands earlier than expected.

Control next passes to step S24 in which the sensor's output value is read. The symbol $i\theta$act indicates the actual angle of the ith joint and the symbol M the actual moment (the aforesaid $M_{act}$) acting on the foot. Control then passes to step S26 in which the difference between the joint angle command value $i\theta$comm and the actual joint angle $i\theta$act is multiplied by the positional feedback control gain Kpos to obtain the positional feedback control component, which is the first component of the velocity command value to be sent as a command to the amplifier. Then, in step S28, the difference between the joint angle command value $i\theta$comm(t+1) at time t+1 and the joint angle command value $i\theta$comm(t) at the current time t is multiplied by the gain Kv to obtain the velocity feedforward control component, which is the second component of the velocity command value to be sent as a command to the amplifier.

Figure 7:
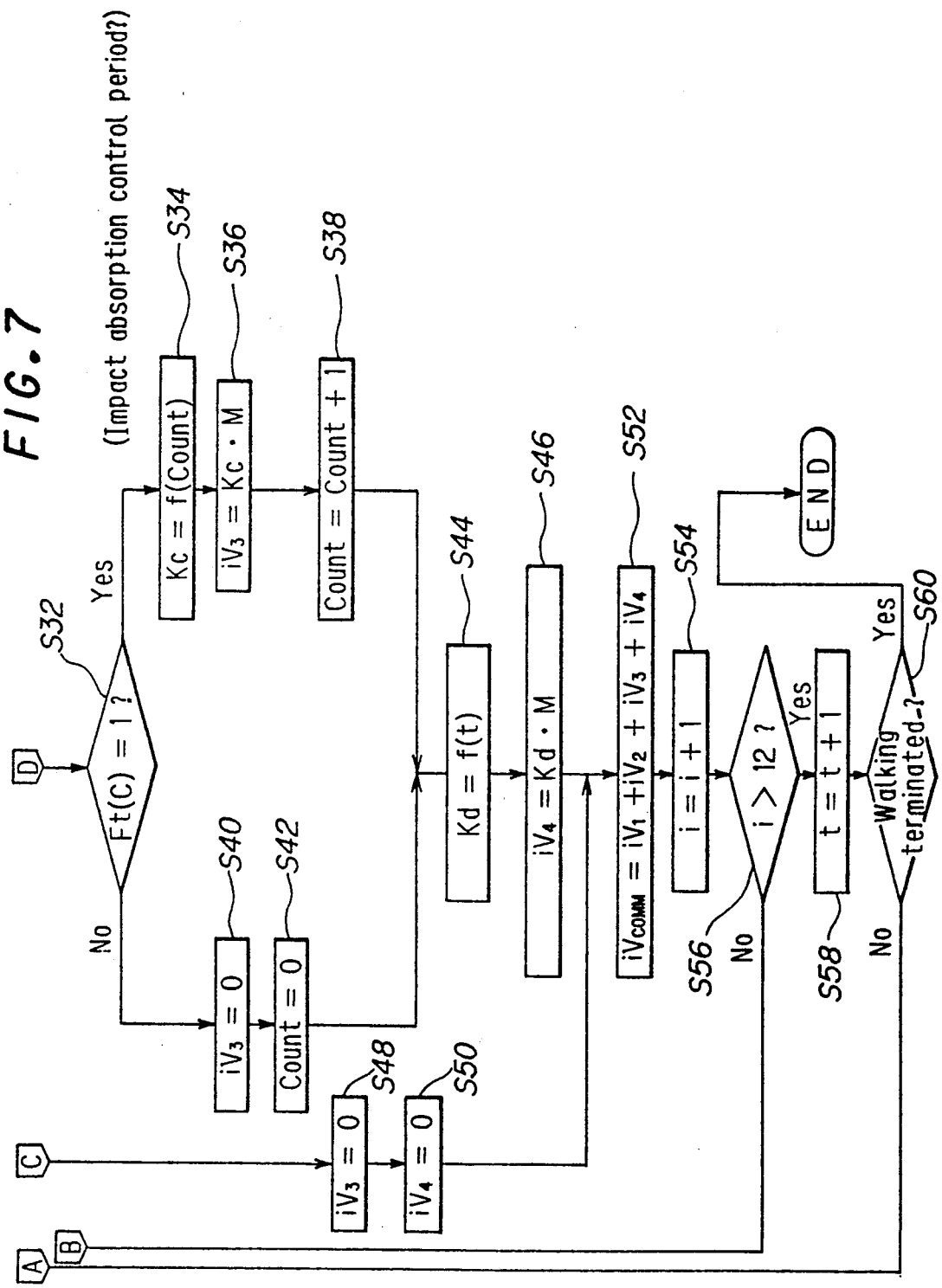
FIG. 7 is the latter half of the flow chart of FIG. 6.

Control then passes to step S30 in which a check is made as to whether or not i is 5 or greater (for determining whether the joint is at the knee or higher) and if result is negative, since this means that the joint is an ankle joint, to step S32 in FIG. 7 in which flag Ft(C) is checked to determine whether or not footfall impact absorption control is to be conducted. If the bit of flag Ft(C) is 1, since this means that footfall impact absorption control is to be conducted, control passes from step S32 to step S34 in which the compliance control gain Kc is retrieved from the characteristics illustrated in FIG. 8 using value Count (which is a time value) as address data, to step S36 in which the actual moment is multiplied by the retrieved gain to calculate a compliance control component iV3, which is the third component of the velocity command value to be sent as a command to the amplifier. Then, in step S38, Count is incremented. On the other hand, if the bit of the flag is found to be not 1 at step S32, since this means that the footfall impact absorption control is not to be conducted, control passes to step S40 in which the third value is determined to be zero, to step S42 in which Count is reset.

Figure 9:
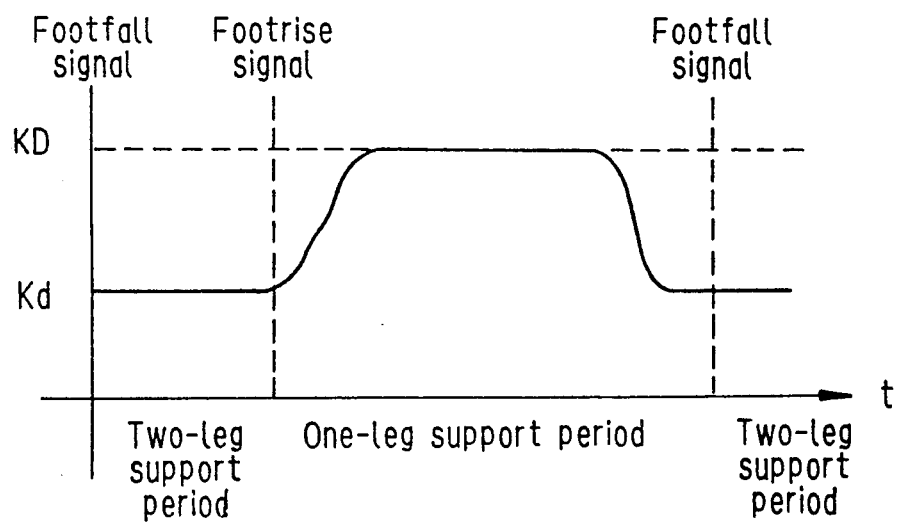
FIG. 9 is an explanatory graph showing the characteristics of a deformation compensation gain referred to in the flow chart of FIG. 7.

Control then passes to step S44 in which the aforesaid deformation compensation gain Kd is retrieved from the characteristics illustrated in FIG. 9 using the time t as address data similarly as the determination of the gain Kc. Here, the gain Kd is a value defined in connection with the reciprocal of Kfoot as was mentioned earlier. The reciprocal itself is termed as KD and the gain Kd is set to be less than KD during the two-leg support period. On the contrary, the gain Kd is set to be the same as KD during the one-leg support period. Moreover, in such a period the gain Kd is varied, as illustrated, with smoothness. The reason why the gain is set to be small during the two-leg support period is that, since the robot legs become closed link during the two-leg support period, if correction is conducted, an interference may occur, which degrades the control in question. Control then passes to step S46 in which the actual moment is again multiplied by the gain Kd to calculate the fourth velocity control value iV4.

Control then passes to step S52 in which all the values calculated earlier are added to obtain the sum iV-COMM and output the same to the amplifier, to step S54 in which the joint number counter is incremented and to step S56 in which a check is made as to whether or not this is the last joint, and if it is, to step S58 in which the time value t is incremented for retrieving the next target joint angles i$\theta$comm(t+1), and to step S60 which repeats the aforesaid operations until it is found that the walking has been terminated.

Since this embodiment detects the moment acting on the relatively low rigidity ankle joints and corrects the deformation caused by the moment, it can determine the control values on the basis of a rigid robot model and then correct them to effectively eliminate positional changes and the like caused by insufficient rigidity of the actual robot. The robot is therefore able to walk stably in the intended manner. Moreover, since the apparent rigidity is made infinite, the freedom of possible compliance control can be increased for more effectively absorbing impacts at the time of footfall. Moreover, since the invention achieves stable walking using a rigid model of the robot, it enables a robot including elastic elements to walk stably, as though its elastic elements had been taken into account, by the use of a rigid model adopted in order to cope with various limitations such as when the capability of the control unit is of a relatively low level inadequate for processing an elastic model or when it is necessary to conduct computations relating to the model at high speed. Thus, owing to this configuration, the embodiment is able to correct any deformation which tends to occur due to the rigidity of a leg link being less than that predicted by the model. The specific advantages are that walking stability can be secured by deciding the control values using a rigid model to approximate the robot, thus reducing the load on the control system, and that the leg links can be fabricated to have low weight and inertia, thus further enhancing the walking stability.

While the embodiment wad described with respect to an example in which the robot's lack of rigidity is offset by using the gain Kd having close relationship with the value 1/Kfoot and thus making the apparent (virtual) rigidity infinitely large, it is alternatively possible to set the value Kd in some other way for obtaining an appropriate apparent rigidity. Further, while it was explained that control for supplementing rigidity it conducted together with compliance control, it is needless to say possible to conduct only the rigidity control.

Figure 8:
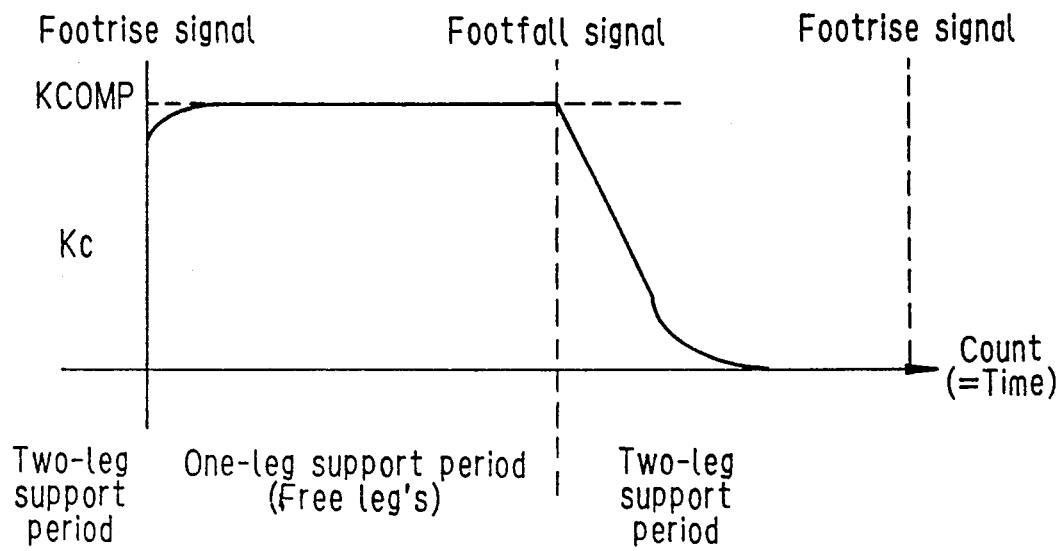
FIG. 8 is an explanatory graph showing the characteristics of a footfall impact absorption control gain referred to in the flow chart of FIG. 7.

In the foregoing, the footrise or footfall in the diagrams of FIGS. 8 and 9 will be detected through the touchdown switch 38. However, it may alternatively possible to use the time determined in the walking pattern. Or it may possible to detect it by comparing moment or force detected by the six-dimensional force and torque sensor 36, or motor current detected by an ammeter, which will be referred to just below in a second embodiment, with a reference value.

In FIG. 2, the arrangement including the ammeter illustrated by phantom lines shows a second embodiment of the invention. The second embodiment focuses on a case in which the discrepancy between the model and actual robot mainly arises from the fact that the servo system's rigidity in joint angle closed loop is low. By detecting motor current and by multiplying it by motor torque constant, it becomes possible to estimate load torque and to further estimate motor's positional error. In the second embodiment, for that reason, motor current will be detected at step S24, instead of moment, and then the load torque TL will be determined from the detected motor current I as $$TL = TC \times I$$

where TC is motor torque constant. The aforesaid command values will be corrected in response to the motor's positional error estimated from the load torque.

Again in FIG. 2, the arrangement including a strain gage illustrated by phantom lines shows a third embodiment of the invention. The third embodiment aims to remedy a case in which the discrepancy is mainly caused by the shortage in Harmonic drives' rigidity. For that purpose, non-liner friction of the Harmonic drives are measured by the strain gage and by multiplying it by a gain, a correctional value will be determined to compensate the friction at step S46 in the flow chart of FIG. 7. Since the details of measurement of the non-linear friction of the Harmonic drives and its compensation by torque control is mentioned in "A Torque Sensing Technique Using Elasticity of Harmonic Drives and Its Application to Torque Control" by Minoru Hashimoto et al, at Harmonic Drive International Symposium held in 1991, no further explanation will be made in this specification.

In the embodiments, although the control was carried out on the ankle joints, the control can alternatively be applied the knee joint or higher.

In the embodiments, although the robot's locomotion was conducted based on the walking pattern predesigned in advance, it may alternatively be possible to determine the walking pattern real time during walking.

While the invention was described with reference to a biped walking robot as an example of a legged walking robot, the invention can also be applied to legged robots other than the biped one.

Moreover, the present invention has thus been shown and described with reference to the specific embodiments. However, it should be noted that the present invention is in no way limited to the details of the described arrangements, changes and modifications may be made without departing from the scope of the appended claims.

What is claimed is:

1. A system for controlling locomotion of a legged walking robot made up of at least one linkage connecting a joint by links, comprising:
   first means for predesigning a model of the robot to determine a target angle of the joint;
   second means for determining a control value in response to the determined target angle of the joint;
   third means for detecting moment or force acting on the joint or the linkage to estimate deformation thereof;
   control mans for correcting the control value to compensate the deformation;
   servo motor means for driving the joint in response to the corrected control value;
   fourth means for determining an amount of rigidity of the joint or linkage to obtain a first value having a relationship with the reciprocal number of the amount of rigidity;
   and said control means corrects the control value by a second value obtained by multiplying the detected moment or force by the first value to compensate the deformation.

2. A system according to claim 1, further including:
   fifth means for determining a second control value to impart compliance to the joint or the linkage;
   and said control means corrects the control value in response to the second control value.

3. A system for controlling locomotion of a legged walking robot made up of at least one linkage connecting a joint by links, comprising:

first means for predesigning a model of the robot to determine a target angle of the joint;

second means for determining a control value in response to the determined target angle of the joint;

third means for detecting moment or force acting on the joint or the linkage to estimate deformation thereof;

control mans for correcting the control value to compensate the deformation;

servo motor means for driving the joint in response to the corrected control value;

fourth means for determining an amount of rigidity of the joint or linkage and said servo motor means to obtain a first value having a relationship with the reciprocal number of the amount of rigidity;

and said control means corrects the control value by a second value obtained by multiplying the detected moment or force by the first value to compensate the deformation.

4. A system according to claim 3, further including:

fifth means for determining a third control value to impart compliance to the joint or the linkage;

and said control means corrects the control value in response to the third control value.

5. A system for controlling locomotion of a legged walking robot having a plurality of leg linkages each having at least one joint, comprising:

first means for designing a first mathematical model of the robot to determine target angles of the joints, the first mathematical model having ideal rigidity;

second means for determining control values in response to the determined target angles of the joints;

third means for predesigning a second mathematical model of the joints in spring/damper/mass system and for detecting moment or force acting on the joints or the linkages to estimate deformation thereof;

fourth means for determining an amount of actual rigidity of the joints or the linkages to obtain a feedback compensation gain;

fifth means for multiplying the detected moment or force by the feedback compensation gain to determine a correction value;

control means for correcting control values in response to the correction value; and servo motor means for driving the joints in response to the corrected control values.

6. A system according to claim 5, wherein the robot is a biped walking robot.

7. A system according to claim 6, wherein the feedback compensation gain is made larger in a period during which the leg linkage is out of the ground than in a period during which the leg linkage is on the ground.

8. A system according to claim 6, wherein the joint is an ankle joint of the robot.